United States Patent [19]

Dec et al.

[11] Patent Number: 5,156,929
[45] Date of Patent: Oct. 20, 1992

[54] FUEL CELL STACK LIQUID ELECTROLYTE MIGRATION PREVENTION ARRANGEMENT

[75] Inventors: Bryan J. Dec, Chicopee, Mass.; Robert Misage, Manchester, Conn.

[73] Assignee: United Technologies Corporation, Hartford, Conn.

[21] Appl. No.: 670,846

[22] Filed: Mar. 18, 1991

[51] Int. Cl.⁵ .............................................. H01M 8/04
[52] U.S. Cl. ......................................... 429/35; 429/18
[58] Field of Search ............................. 429/18, 35, 36; 427/115

[56] References Cited

U.S. PATENT DOCUMENTS

| | | | |
|---|---|---|---|
| 3,867,206 | 2/1975 | Trocciola et al. | 429/35 |
| 4,588,661 | 5/1986 | Kaufman et al. | 429/36 |
| 4,728,533 | 3/1988 | Feigenbaum | 427/57 |
| 4,732,637 | 3/1988 | Dettling et al. | 429/36 X |
| 4,761,348 | 8/1988 | Kunz et al. | 429/35 |
| 4,786,568 | 11/1988 | Elmore et al. | 429/44 |
| 4,929,517 | 5/1990 | Luoma | 429/34 |
| 4,978,590 | 12/1990 | Granata, Jr. et al. | 429/35 |
| 4,978,591 | 12/1990 | Wright | 429/35 |

Primary Examiner—Anthony Skapars
Attorney, Agent, or Firm—Peter R. Ruzek

[57] ABSTRACT

A fuel cell stack includes a plurality of fuel cells juxtaposed with one another in the stack and each including a pair of plate-shaped anode and cathode electrodes that face one another, and a quantity of liquid electrolyte present at least between the electrodes. A number of separator plates that are substantially impermeable to liquids but wettable by electrolyte is interposed between respective successive electrodes of adjacent ones of the fuel cells. Each such separator plate has edge portions situated at a periphery of the fuel stack and having a peripheral surface, and marginal surfaces respectively facing the successive electrodes and forming respective interfaces therewith. Migration of any electrolyte that may be present at one of the interfaces to the other of the interfaces and thus from one to the other of the adjacent fuel cells is prevented by providing a layer of a material that is non-wettable by the electrolyte at least on the peripheral surface of the separator plate, but advantageously also on the marginal surfaces.

3 Claims, 1 Drawing Sheet

FUEL CELL STACK LIQUID ELECTROLYTE MIGRATION PREVENTION ARRANGEMENT

DESCRIPTION

1. Technical Field

The present invention relates to fuel cell devices in general, and more particularly to an arrangement for avoiding liquid electrolyte migration in fuel cell stacks.

2. Background Art

There are already known various constructions of fuel cell devices, most if not all of which include a multitude of individual fuel cells that are arranged in fuel cell groups or stacks. As is well known, each such fuel cell includes an anode, a cathode, and a quantity of electrolyte or another ion transfer or exchange medium being present at least between (and often also within) the anode and the cathode. Then, as hydrogen (or another gaseous fuel) and oxygen (as such or as an ingredient of air) are supplied to the anode and the cathode, respectively, an electrochemical reaction takes place in each of such individual fuel cells, resulting in the formation of water as the reaction product, with attendant creation of electrical potential difference between the anode and the cathode that is then utilized, ordinarily in conjunction with that created in the other fuel cells, to supply electric power to an external user device or circuit. At least the effective region of each anode and of each cathode has to have a porous structure to allow penetration of at least the gaseous fuel and the oxygen, respectively, therethrough from the respective gaseous medium supply side to the areas at which the usually catalytically promoted electrochemical reaction takes place in the presence of the electrolyte. When arranged in a fuel cell stack, the individual fuel cells are typically separated from one another by respective separator plates that are interposed between the fuel cells and are usually electrically conductive but, to the extent possible, impervious both to liquids and gases.

Experience especially with fuel cell devices employing acid electrolytes has shown that some of the electrolyte is lost during the operation of the device. Primarily for this reason, each of the fuel cells is initially charged with a quantity of electrolyte that is in excess of that needed at the outset of the fuel cell device operation but is sufficient for sustaining the operation of the device for an extended period of time, such as for 40,000 hours, despite the electrolyte losses, and measures are taken to minimize the amount of electrolyte escaping from the individual fuel cells.

One of such measures involves sealing of all the passages through which the electrolyte could escape from the fuel cells. This includes not only the arrangement of edge seals at the interfaces between the adjacent ones of the various components (cathodes, anodes, separator plates, etc.) of the fuel cell stack, but also the plugging of the pores of the anode and the cathode components at the edge regions thereof. One way of dealing with at least the latter problem is disclosed, for instance, in the Japanese patent application No. 61-263061(A), published on Nov. 21, 1986, in that the edge region of the electrode is sealed by applying a fluorine resin film thereto in such a manner that it not only covers the peripheral surface of the edge region but also extends to a certain extent onto the marginal portions of the major surfaces of the electrode that face and come into contact with other components of the fuel cell stack upon assembly of the device, followed by thermal curing of the resin.

While the above approach may well achieve its purpose of preventing or at least minimizing electrolyte leakage onto the peripheral surface of the electrode, it has been established that it is ineffective in dealing with another weighty problem encountered in fuel cell stacks, namely, that of electrolyte migration through the fuel stack in the course of operation of the latter. More particularly, it was found out that, over the useful operating life of a fuel cell device consisting of a stack of juxtaposed fuel cells separated from each other by respective separator plates and employing a liquid electrolyte, the electrolyte concentration and/or amount in the fuel cells, which is originally substantially uniform throughout the stack, gradually changes to a substantially increased value at one end of the stack and a substantially decreased value at the other end of the stack, with the values for the fuel cells situated between such ends gradually decreasing from the one end to the other. This eventually results in electrolyte flooding of the cell or cells situated at or near the one end, and in drying out of the affected fuel cell or cells at or near the other end of the stack. Each of these conditions is equally undesirable in that it has a deleterious effect on the performance of the affected fuel cell and may even result in premature deterioration or even complete destruction thereof.

At first, it was assumed, quite correctly, that this electrolyte migration was attributable to the less than perfect imperviousness of the separator plates to the passage of liquid therethrough in that the electrolyte was driven by electrical forces existing in the fuel cell stack through the respective separator plates in the direction from the other end to the one end of the stack. However, more recently, it was discovered that electrolyte migration occurs even when the separator plates are highly or completely impervious. This led to the conclusion, confirmed by observation, that some electrolyte still seeps out through the interface between one electrode of the respective fuel cell and the separator plate facing the same onto the peripheral surface of the separator plate, travels on this peripheral surface, and eventually enters the next adjacent fuel cell through the interface between the separator plate and the electrode of the adjacent fuel cell that adjoins this separator plate. Moreover, it was discovered that the electrolyte present on the peripheral surface of the separator plate allows electrical shunt current to flow at such surface and thus cause or contribute to corrosion at the peripheral region of the fuel cell stack. As mentioned before, the approach presented in the above-mentioned published Japanese patent application does not obviate the problem of electrolyte propagation on the peripheral surface of the separator plate in that at least some electrolyte is still able to seep out of one fuel cell through the interface between the respective electrode and the separator plate and enter the adjacent fuel cell through the next adjacent corresponding interface. By the same token, due to the electrical bridging action of the electrolyte present on the separator plate periphery, the corrosion attributable to the electric shunt current flow is not avoided either.

Accordingly, it is a general object of the present invention to avoid the disadvantages of the prior art.

More particularly, it is an object of the present invention to provide a fuel cell device consisting of a stack of juxtaposed individual fuel cells containing a liquid electrolyte and separated from one another by respective separator plates, which device does not possess the disadvantages of the known devices of this kind.

Still another object of the present invention is so to develop the fuel cell device of the type here under consideration as to avoid cell-to-cell electrolyte migration and edge region corrosion due to electric shunt currents.

It is yet another object of the present invention to design an electrolyte migration prevention arrangement for the fuel cell device of the above type in such a manner as to be relatively simple in construction, inexpensive to manufacture, easy to use, and yet reliable in operation.

A concomitant object of the present invention is to devise a process and apparatus that are excellently suited for manufacturing fuel cell devices equipped with the electrolyte migration preventing arrangement of the above kind.

DISCLOSURE OF THE INVENTION

In keeping with these objects and others which will become apparent hereafter, one feature of the present invention resides in a fuel cell stack which includes a plurality of fuel cells juxtaposed with one another in the stack and each including a pair of plate-shaped anode and cathode electrodes that face one another, and a quantity of liquid electrolyte present at least between the electrodes, and means for supplying a gaseous fuel and oxygen to the anode electrode and the cathode electrode, respectively, of each of the pairs. A number of substantially liquid-impermeable but electrolyte-wettable separator plates is interposed between respective successive electrodes of adjacent ones of the fuel cells. Each such separator plate has edge portions situated at a periphery of the fuel stack and delimited by a peripheral surface, and by marginal surfaces respectively facing the successive electrodes and forming respective interfaces therewith. According to the invention, there is provided means for preventing migration of any electrolyte that may be present at one of the interfaces to the other of the interfaces and thus from one to the other of the adjacent fuel cells, such migration preventing means including a layer of a material that is non-wettable by the electrolyte covering at least the peripheral surface of the separator plate interposed between the successive electrodes.

BRIEF DESCRIPTION OF THE DRAWING

The present invention will be described in more detail below with reference to the accompanying drawing in which.

BEST MODE FOR CARRYING OUT THE INVENTION

Figure 1:
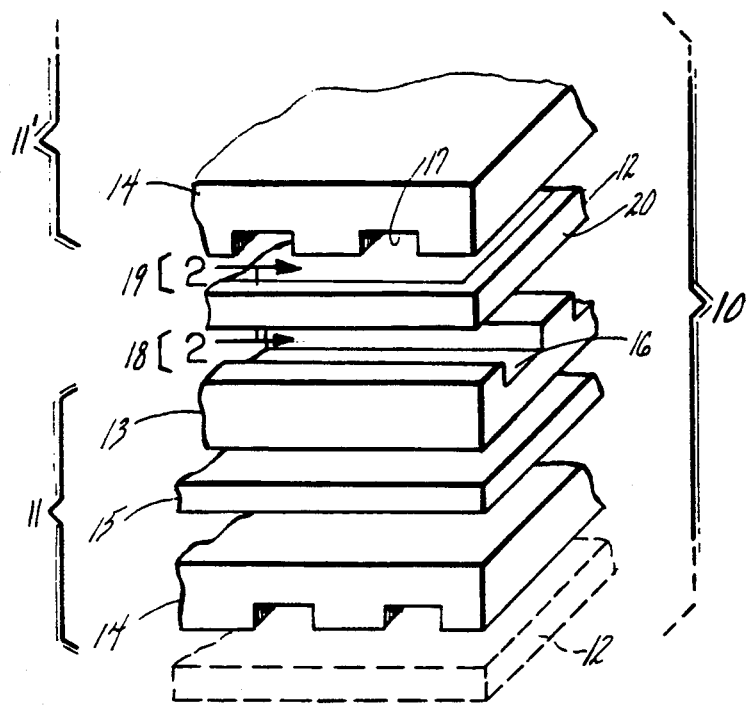
FIG. 1 is a somewhat simplified diagrammatic view of a fragment of a fuel cell stack including separator plates in accordance with the present invention.

Referring now to the drawing in detail, and first to FIG. 1 thereof, it may be seen that the reference numeral 10 has been used therein to identify a fuel cell stack of a fuel cell device that is of any known construction so that it that need not be explained here in detail. Suffice it to say that the stack 10 includes a plurality of individual fuel cells, denoted as 11 without differentiation therebetween, which are juxtaposed with one another (usually superimposed as shown) and are separated from each other by respective separator plates, of which only one is shown in full and another merely indicated, each being identified by the reference numeral 12.

The fully depicted fuel cell 11 (and, similarly, each of the other fuel cells 11 of the stack 10) includes, as its basic components, an anode electrode 13, a cathode electrode 14, and an electrolyte body 15 disposed between the electrodes 13 and 14. In the illustrated fuel cell structure, the electrolyte body 15 is constructed as a solid material plate, such as a porous electrolyte-retaining matrix. However, it is to be mentioned at this juncture that the construction of the individual fuel cells 11 is depicted in the drawing only in such a detail as is necessary for understanding the present invention and to the extent needed to explain the principles of construction and operation of the fuel cells 11 and of the fuel cell stack 10 including the same, and that the actual construction of the fuel cells 11 may vary from that depicted. So, for instance, catalyst layers that are typically present at the interfaces between the electrodes 13 and 14 and the electrolyte body 15 have been omitted from the drawing. Furthermore, while the electrodes 13 and 14 have been shown to be provided, at their regions facing the respective separator plates 12, with respective channels 16 and 17 serving to distribute gaseous fuel (such as hydrogen) and oxygen (alone or as a constituent component of air) over the anode electrode 13 and the cathode electrode 14, respectively, it will be appreciated that such channels 16 and 17 could just as well be provided in the separator plates 12, instead of or in addition to those provided in the electrodes 13 and 14.

In any event, when the stack 10 is in its assembled condition, the electrolyte body 15 contains a quantity of a liquid electrolyte sufficient for an electrochemical reaction, during which oxygen and fuel are combined with one another to form product water, to take place in the respective fuel cell 11, with attendant creation of an electrical potential difference between the anode and cathode electrodes 13 and 14. The separator plate 15 is electrically conductive to provide electrical connection between the adjacent or successive ones of the fuel cells 11 in the stack 10, but it is as impermeable to liquids and gases as possible, not only to prevent passage of the gaseous fuel or oxygen therethrough with attendant formation of a highly combustible gas mixture, but also to avoid migration of the electrolyte between the individual fuel cells 11 of the stack 10, which is driven or enhanced by the aforementioned electrical potential differences.

Experience has shown that, despite all precautions that are taken to avoid electrolyte loss, some electrolyte still manages to escape from the individual fuel cells 11 during the operation of the fuel cell device and leave the stack 10 after it has reached the periphery thereof or other surfaces at which it comes into contact with any gaseous medium, such as by evaporating into the respective gaseous medium. To make up for this loss and thus to make sure that the fuel cell device is able to operate over an extended operating period, it is currently customary to originally charge each of the fuel cells 11 with more than the above electrolyte quantity that is required to be present in the electrolyte body 15. The additional amount is then typically accommodated in at least one of the electrodes 13 and 14 which are porous in order to permit the passage of the gaseous fuel and oxygen therethrough to the sites at which the electrochemical reaction takes place, so that the respective electrode 13 or 14 doubles as a replenishment electrolyte retaining body from which electrolyte is gradually drawn into the electrolyte body 15 to replenish the electrolyte amounts lost therefrom over the operating lifetime of the fuel cell device.

It was determined that the aforementioned cell-to-cell electrolyte migration, if not reined in, has a deleterious or even destructive effect on the fuel cell device and its operation, in that it ultimately results in drying out of the fuel cell or cells 11 situated at one end of the stack 10 and in flooding of the cell or cells 11 disposed at the other end of the stack 10, and that it occurs in the fuel cell device as described so far even if measures are taken to assure that the separator plate 12 is completely impervious to the electrolyte. It was realized that such residual electrolyte migration is attributable to the fact that some electrolyte is able to reach the peripheral surface of the fuel cell 11, be it through respective ordinarily sealed interfaces, such as 18 and 19 existing between the separator plate 12 and the electrodes 13 and 14, respectively, or through the pores of the respective electrodes 13 and 14 or other components of the fuel cell 11, and wick its way upon the outer peripheral surface of the separator plate 12 to the adjacent fuel cell 11, and so on in succession. This occurs even when the edge portions of the electrodes 13 and 14 are coated with fluorocarbon resin to provide an edge seal thereat. It was also realized that, once the electrolyte establishes a continuous path extending between the interfaces 18 and 19 on any region of or all over the outer peripheral surface of the separator plate 12, it electrically bridges the gap between the adjacent fuel cells 11 and conducts electric shunt current which then causes or contributes to corrosion at the outer periphery of the fuel cell stack 11 and especially on the outer peripheral surface of the separator plate 12.

Based on the above realizations, it is proposed in accordance with the present invention to provide a coating layer 20 of a material that is non-wettable by the electrolyte at least all over the outer peripheral surface of the separator plate 12. This coating layer 20, owing to its non-wettability, interrupts the path along which the electrolyte could otherwise creep from one of the fuel cells 11 to the adjacent one, and so on in sequence, thus interfering with and completely preventing cell-to-cell electrolyte migration, while simultaneously preventing the leaking electrolyte from forming the aforementioned electrical path through which the electrical shunt current would otherwise flow, with the attendant deleterious corrosive effect.

Figure 2:
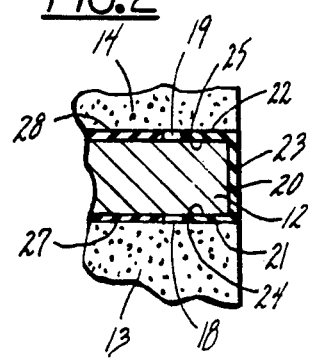
FIG. 2 is a cross sectional view, at a slightly enlarged scale, of a detail 2—2 of FIG. 1.

As shown particularly in FIG. 2 of the drawing, the layer 20 further includes extensions 21 and 22 that form integral continuations of a central region 23 of the coating layer 20 that covers the aforementioned outer peripheral surface of the separator plate 12. The extensions 21 and 22 cover respective marginal portions 24 and 25 of the respective major surfaces of the separator plate 12 and thus penetrate to a certain distance, such as in the range between $\frac{1}{8}$ to $\frac{1}{4}$", into the respective interfaces 18 and 19. This latter measure is especially effective when the other surface portions delimiting the interfaces 18 and 19 are also, or are treated or coated to be, non-wettable by the electrolyte, in that the electrolyte is thus prevented from creeping along both of the surfaces bounding the respective interface 18 or 19.

FIG. 2 of the drawing also shows that respective sealing elements or layers 27 and 28 may be disposed in the respective interfaces 18 and 19, to provide a sealing effect. In this context, it is to be mentioned that the extensions 21 and 22 of the coating layer 20 need not necessarily act as seals in the traditional sense of that word, that is, they are not necessarily in sealing contact with those surface portions of the respective electrodes 13 and 14 that face the same; rather, they interfere with electrolyte seepage through the respective interfaces 18 and 19 merely as a result of their non-wettability. Under such circumstances, the sealing elements or layers 27 and 28 alone perform the sealing action, and they terminate short of (i.e. more remotely from the peripheral surface of the separator plate 12 than) the extensions 21 and 22 in order to prevent electrolyte propagation along the ordinarily wettable surfaces of such sealing elements or layers 27 and 28 past the extensions 21 and 22. In any event, inasmuch as the coating layer 20 is being used for its non-wettable properties, it need not be overly thick; ordinarily, thickness in the range substantially between 0.0005 and 0.001" is quite sufficient.

It stands to reason that, as may be partially perceived from FIG. 1, the central region 23 of the coating layer 20 (and, if present, the extensions 21 and 22 thereof) are to be present at all four of the edge regions of the separator plate 12, so as to completely interrupt any path along which the electrolyte could possibly creep between the adjacent or successive fuel cells 11 over the outer peripheral surface of the separator plate 12.

Figure 3:
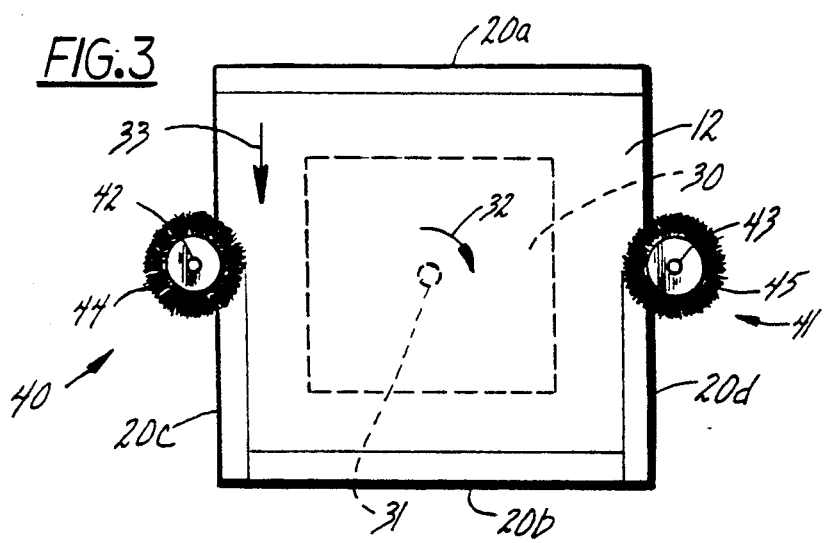
FIG. 3 is a top plan view of the separator plate of FIG. 1 and of a rather rudimentary embodiment of an arrangement for applying a non-wettable coating to the edge regions thereof.
Figure 4:
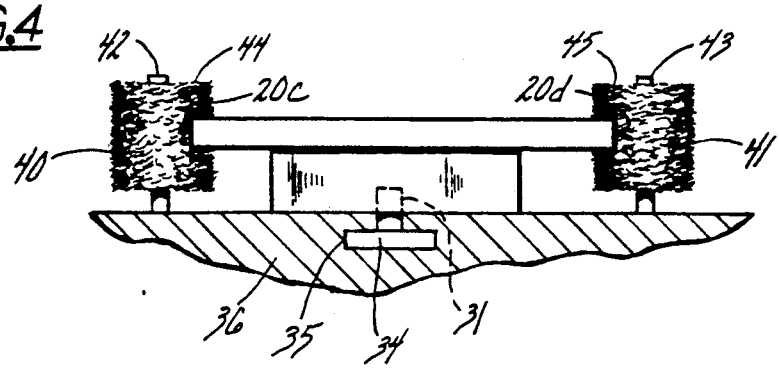
FIG. 4 is a side elevational view of the arrangement and separator plate depicted in FIG. 3.

FIGS. 3 and 4 of the drawing indicate how such a peripherally continuous non-wettable coating layer 20 including the extensions 21 and 22 can be applied to the respective separator plate 12 prior to the inclusion of the latter in the stack 10. FIG. 3 illustrates the situation existing after two portions 20a and 20b of the peripherally complete coating layer 20 have already been fully applied to respective opposite lateral or edge regions of the separator plate, and in the process of formation of another two portions 20c and 20d of the layer 20 on the remaining two edge regions of the separator plate 12. During this operation, the separator plate 12 is immovably supported, in any known manner that has not been revealed in the drawing, on a turntable 30 that is turnable or indexable about a pivot 31, as indicated by an arrow 32, in such a manner that the separator plate 12 extends beyond the turntable 30 at all four of its sides. The turntable 30 is also displaceable in and opposite to the direction indicated by an arrow 33. As indicated in FIG. 4, this can be achieved by providing the pivot 31 with an enlarged head portion 34 that is received in a correspondingly configured groove 35 that is provided in a support 36 and extends in the direction of the arrow 33 of FIG. 3.

Two coating application rollers 40 and 41 are mounted on the support 36 at opposite sides of the path of movement of the separator plate 12 with the turntable 30 for rotation about their respective pivot axles 42 and 43. As a comparison of FIGS. 3 and 4 will reveal, each of the rollers 40 and 41 has a relatively compliant outer region 44 and 45, such as one constituted by bristles or fabric with a nap of a predetermined depth. The pivot axles 42 and 43 are spaced from one another by such a distance that, when the separator plate 20 passes between them, the roller regions facing the peripheral surfaces of the separator plate 12 yield out of the way, and the bristles or naps of the compliant regions 44 and 45 extend along and come into contact with the aforementioned marginal portions of the major surfaces of the separator plate 12, depositing thereon a liquid material or ink that is a precursor of the non-wettable material, to advantage consisting of or including a fluorinated hydrocarbon, such as polytetrafluouroethylene. Preferably, such precursor material is a dispersion commercially available from E. I. DuPont de Nemours & Co. under the designation FEP-120, which is applied to the rollers 40 and 41 in any well-known manner such to be transferred therefrom to the separator plate 12.

After the coating layer application operation is completed, the coating layer 20 is allowed or caused to dry and is subjected to a sintering operation which results in the conversion of the precursor material into the non-wettable material. Thus, the coating layer 20 may first be dried at a moderate temperature in the range substantially between room temperature and 250° F. and then sintered in air at a temperature substantially in the range of 550° F. to 700° F. However, the preliminary drying out of the coating layer 20 may even be dispensed with in many cases, in which case only the aforementioned sintering step is being conducted, with the drying out of the coating layer 20 taking place in its course.

Tests conducted using separator plates 12 provided with the peripherally complete non-wettable coating layer 20 fabricated in the above-described manner have confirmed that the layer 20, if not damaged, such as during subsequent handling of the thus treated separator plate 12 or assembly of the fuel cell device, constitutes a perfect barrier against cell-to-cell electrolyte migration over the outer periphery of the separator plate 12.

While the present invention has been illustrated and described as embodied in a particular construction of a fuel cell device, it will be appreciated that the present invention is not limited to this particular example; rather, the scope of protection of the present invention is to be determined solely from the attached claims.

What is claimed is:

1. A fuel cell stack comprising
    a plurality of fuel cells juxtaposed with one another in the stack and each including a pair of plate-shaped anode and cathode electrodes that face one another, and a quantity of liquid electrolyte present at least between said electrodes;
    means for supplying a gaseous fuel and oxygen to said anode electrode and said cathode electrode, respectively, of each of said pairs;
    a number of substantially liquid-impermeable but electrolyte-wettable separator plates interposed between respective successive electrodes of adjacent ones of said fuel cells, each of said separator plates having respective edge portions situated at a periphery of the fuel stack and delimited collectively by a peripheral surface, and individually by two marginal surfaces respectively facing said successive electrodes of said adjacent fuel cells and forming respective interfaces therewith; and
    means for preventing migration of any electrolyte that may be present on the periphery of the fuel cell stack at one of said interfaces to the other of said interfaces and thus from one to the other of said adjacent fuel cells, including a layer of a material that is non-wettable by the electrolyte covering at least said peripheral surface of that of said separator plates which is interposed between said successive electrodes of said adjacent fuel cells.

2. The fuel cell stack as defined in claim 1, wherein said layer includes at least one integral continuing portion that extends to a predetermined extent onto at least one of said marginal surfaces and thus into one of said interfaces.

3. The fuel cell stack as defined in claim 2, and further comprising means for sealing at least said one interface, said sealing means being located adjacent, and more remotely from said peripheral surface than, said integral continuing portion of said layer.

* * * * *